United States Patent
Ito et al.

(10) Patent No.: US 8,166,317 B2
(45) Date of Patent: Apr. 24, 2012

(54) SYSTEM FOR REDUCING STANDBY POWER IN AN AC ADAPTER THAT SUPPLY POWER TO A USB DEVICE

(75) Inventors: Tsukasa Ito, Nagoya (JP); Taichi Ejiri, Nagoya (JP); Masahiko Horibe, Nagoya (JP); Suguru Ishii, Nagoya (JP)

(73) Assignee: Buffalo Inc., Nagoya (JP)

( * ) Notice: Subject to any disclaimer, the term of this patent is extended or adjusted under 35 U.S.C. 154(b) by 439 days.

(21) Appl. No.: 12/422,903

(22) Filed: Apr. 13, 2009

(65) Prior Publication Data

US 2009/0259866 A1 Oct. 15, 2009

(30) Foreign Application Priority Data

Apr. 15, 2008 (JP) ................... 2008-105306

(51) Int. Cl.
G06F 1/00 (2006.01)
G06F 1/26 (2006.01)
G06F 1/32 (2006.01)

(52) U.S. Cl. ........ 713/300; 713/310; 713/320; 713/323; 713/324; 713/340

(58) Field of Classification Search .................. 713/300, 713/310, 320, 323, 324, 340
See application file for complete search history.

(56) References Cited

U.S. PATENT DOCUMENTS

| | | | | |
|---|---|---|---|---|
| 7,489,528 B2* | 2/2009 | Tanaka et al. | ............. | 363/21.01 |
| 7,930,571 B2* | 4/2011 | Sathath et al. | ................ | 713/310 |
| 2002/0186395 A1* | 12/2002 | Katsu | ........................... | 358/1.13 |
| 2003/0067224 A1* | 4/2003 | Tai | ................................ | 307/117 |
| 2003/0070103 A1* | 4/2003 | Kim | ............................... | 713/300 |
| 2004/0147162 A1* | 7/2004 | Chen et al. | .................... | 439/502 |
| 2005/0030680 A1* | 2/2005 | Lee et al. | ........................ | 361/18 |
| 2005/0262367 A1* | 11/2005 | Shih | ............................. | 713/323 |
| 2008/0094387 A1* | 4/2008 | Chen | ............................. | 345/212 |

FOREIGN PATENT DOCUMENTS

| | | |
|---|---|---|
| CN | 1567139 | 1/2005 |
| JP | 3069308 U | 3/2000 |
| JP | 2002-189541 | 7/2002 |
| JP | 2003-118204 | 4/2003 |
| JP | 2004-234334 A | 8/2004 |
| JP | 2005-049651 | 2/2005 |

OTHER PUBLICATIONS

Chinese Office Action dated Jun. 22, 2010 from Chinese Patent Application No. 200910134947.0 (with English translation).
Notification of Reason for Rejection dated Nov. 15, 2011 from Japanese Patent Application No. 2008-105306.

* cited by examiner

Primary Examiner — Vincent Tran
(74) Attorney, Agent, or Firm — Beyer Law Group LLP

(57) ABSTRACT

An electronic device has: an operation unit; a power supply unit; an input changeover switch; and a controller. The power supply unit is supplied commercial power and supplies the operating power to the operation unit. The input changeover switch switches between supplying or not supplying the commercial power to the power supply unit. The controller controls the input changeover switch. The controller includes: a power input portion; a control signal input portion; and a switching signal output portion. When the device power is being supplied from a master electronic device to the power input portion and the control signal from the master electronic device is received by the control signal input portion, the switching signal output portion outputs to the input changeover switch a signal instructing to switch and supply the commercial power to the power supply unit.

9 Claims, 8 Drawing Sheets

SYSTEM FOR REDUCING STANDBY POWER IN AN AC ADAPTER THAT SUPPLY POWER TO A USB DEVICE

BACKGROUND

1. Technical Field

The present invention relates to an electronic device, and to a power supply unit.

2. Related Art

So-called peripheral devices (electronic devices), for example a hard disk drive, connected to a personal computer and whose power is switched on and off in association with switching on and off of the power of the personal computer, enjoy widespread use. Such electronic devices are very convenient as they do not require user operations to switch the power on and off during use of the peripheral device. Additionally, when the power to the computer goes off, the power to the peripheral device will go off automatically so power consumption by the peripheral device can be kept to a minimum.

To date, various technologies have been proposed in relation to electronic devices having functionality whereby power to the device is switched on and off in association with switching on and off of the power of the personal computer.

An electronic device having the functionality described above will be furnished with an AC adapter (power supply unit) that is internal or externally connected. The AC adapter is connected to a commercial power supply (e.g. 100V AC), and the AC adapter is always in the standby state even when the power of the personal computer is off. Thus, the AC adapter consumes standby power. However, in conventional AC adapters, negligible consideration was given to limiting such consumption of standby power by the AC adapter.

With the foregoing in view, an advantage of some aspects of the invention is to reduce consumption of standby power in an internal or externally-connected power supply unit of an electronic device.

The entire disclosure of Japanese patent application No. 2008-105306 of BUFFALO is hereby incorporated by reference into this document.

SUMMARY

The present invention is addressed to attaining the above objects at least in part according to the following modes of the invention.

Aspect 1.

An electronic device comprising:

an operation unit that is supplied operating power and operates;

a power supply unit that is supplied commercial power from a commercial power supply and supplies the operating power to the operation unit;

an input changeover switch that switches between supplying or not supplying the commercial power from the commercial power supply to the power supply unit; and a controller that controls the input changeover switch, wherein the controller includes:

a power input portion that is supplied device power from a master electronic device;

a control signal input portion that receives a control signal from the master electronic device; and a switching signal output portion that, when the device power is being supplied to the power input portion and the control signal is received by the control signal input portion, outputs to the input changeover switch a commercial power input signal instructing the input changeover switch to switch and supply the commercial power to the power supply unit.

According to the electronic device of the aspect 1, the control portion is started up by power supplied from the master electronic device. The electronic device of the aspect 1 also has an input changeover switch adapted to switch between inputting or not inputting commercial power from a commercial power supply to the power supply unit. This input changeover switch inputs power from the master electronic device to its power input portion while inputting the control signal to its control signal input portion, and during standby periods assumes the Off state until receiving input of the commercial power input signal from the changeover signal output portion. Consequently, during periods that the input changeover switch is Off, commercial power will not be supplied to the power supply unit, so consumption of standby power by the power supply unit provided to the electronic device can be reduced. In the electronic device of the aspect 1, the power supply unit and the input changeover switch may be housed inside the chassis of the electronic device; or externally connected to the chassis of the electronic device. The input changeover switch may also be internally provided to the power supply unit.

Aspect 2.

The electronic device in accordance with aspect 1 wherein the controller outputs to the input changeover switch a commercial power disconnect signal instructing the input changeover switch to switch and disconnect the commercial power to the power supply unit, when the control signal input portion does not receive the control signal for a prescribed time interval after the commercial power input signal has been output to the input changeover switch by the switching signal output portion.

According to the electronic device of the aspect 2, the input changeover switch can switch and disconnect the commercial power to the power supply unit, when the control signal input portion does not receive the control signal for a prescribed time interval after the commercial power input signal has been output to the input changeover switch by the switching signal output portion. Accordingly, consumption of power by the electronic device can be reduced further.

Aspect 3.

The electronic device in accordance with aspect 1 or 2 wherein the power input portion includes a power supply changeover switch that switches between supplying the device power to the operation unit as the operating power or supplying the operating power from the power supply unit to the operation unit; and the controller switches the power supply changeover switch to supply the operating power from the power supply unit to the operation unit, when the commercial power input signal is output to the input changeover switch by the switching signal output portion.

According to the electronic device of the aspect 3, the controller switches to disconnect the supply of the device power and to supply the operating power from the power supply unit to the operation unit, when the commercial power input signal is output to the input changeover switch by the switching signal output portion. Accordingly, in case where the electric device is a portable electric device powered by the battery, for example, consumption of battery power can be reduced.

Aspect 4.

The electronic device in accordance with aspect 3 wherein the controller switches the power supply changeover switch to supply the device power to the operation unit as the operating power, when the control signal input portion does not receive the control signal for a prescribed time interval after the commercial power input signal has been output to the input changeover switch by the switching signal output portion.

According to the electronic device of the aspect 4, the controller switches to supply the device power from the master device to the operation unit, when the control signal input portion does not receive the control signal for a prescribed time interval after the commercial power input signal has been output to the input changeover switch by the switching signal output portion. In the above situation, the electronic device of the aspect 4 can wait the input of the control signal without consuming the power in the power supply unit. Accordingly, consumption of power by the electronic device can be reduced.

Aspect 5.

The electronic device in accordance with any of aspects 1 to 4 wherein the operation unit is a hard disk drive unit, and
the master electronic device is a personal computer.

Aspect 6.

The electronic device in accordance with any of aspects 1 to 5 wherein the controller and the master electronic device are connected by a USB (Universal Serial Bus) cable, the device power is supplied by USB bus power from the master electronic device via the USB cable, and the control signal includes an SOF (Start of Frame) packet in a header.

One aspect of the electronic device of the present invention may be connected to the master device by a cable adapted to supply both power and a control signal, such as an IEEE 1394 cable, eSATA (external Serial ATA) cable, or LAN cable for example, instead of a USB cable. In this case, the control signal would be modified appropriately according to the particular standard. The electronic device of the present invention may also utilize separate cables for input of the control signal and power from the other electronic device.

Aspect 7.

An electronic device comprising:

an operation unit that is supplied operating power and operates; and a controller, wherein the electronic device is electrically connected with a power supply unit that is supplied commercial power from a commercial power supply and configured to switch between being supplied or not being supplied the commercial power from the commercial power supply, wherein the controller includes:

a power input portion that is supplied device power from a master electronic device;

a control signal input portion that receives a control signal from the master electronic device; and a switching signal output portion that, when the device power is being supplied to the power input portion and the control signal is received by the control signal input portion, outputs to the power supply unit a commercial power input signal instructing to switch and being supplied the commercial power.

According to the electronic device of the aspect 7, when power is input to the power input portion by the master electronic device while a control signal is input to the control signal input portion, a commercial power input signal will be output to a power supply unit having an input changeover switch that is connected externally to the electronic device of the aspect 7 adapted to switch between inputting or not inputting commercial power from a commercial power supply. During standby periods the input changeover switch of the power supply unit will assume the Off state until receiving input of a commercial power input signal output by the electronic device of the aspect 7. Consequently, consumption of standby power by the power supply unit externally connected to the electronic device can be reduced.

Aspect 8.

A power supply unit electrically connected to a commercial power supply and to an electronic device, wherein the power supply unit is supplied commercial power from the commercial power supply and supplies operating power to the electronic device, wherein the power supply unit comprises an input changeover switch that switches between being supplied or not being supplied the commercial power from the commercial power supply according to a signal input from the electronic device.

The power supply unit according to the aspect 8 is provided with the aforementioned input changeover switch; and during standby periods will assume the Off state until receiving input of a prescribed signal output by the electronic device to which the power supply unit has been connected. Consequently, consumption of standby power by the power supply unit which has been externally connected to the electronic device can be reduced. The power supply unit of the aspect 8 can be utilized by being externally connected to the electronic device of the seventh mode described previously.

The present invention may also be put into practice through appropriate combinations of certain of the various features described above. In addition to being put into practice as an electronic device or power unit, the present invention may also be put into practice as a method invention for controlling an electronic device or a power supply unit. Various additional possible modes are a computer program for implementing such a method; a recording medium having such a program recorded thereon; or a data signal that contains such a program and that is carried on a carrier wave. These modes may employ the various supplemental elements shown previously.

Where the present invention is put into practice as a computer program or recording medium having such a program recorded thereon, it may constitute the entire program for controlling operations of the electronic device or power supply unit, or constitute only those modules which carry out the functions of the present invention. Possible recording media include any of various computer-readable media such as flexible disks, CD-ROM, DVD-ROM, magnetooptical disks, IC cards, ROM cartridges, punch cards, printed materials having symbols such as a barcode imprinted thereon, computer internal storage devices (memory such as RAM or ROM), and external storage devices.

These and other objects, features, aspects, and advantages of the present invention will become more apparent from the following detailed description of the preferred embodiments with the accompanying drawings.

DESCRIPTION OF EXEMPLARY EMBODIMENT

The present invention will be described below on the basis of certain preferred embodiments.

Figure 1:
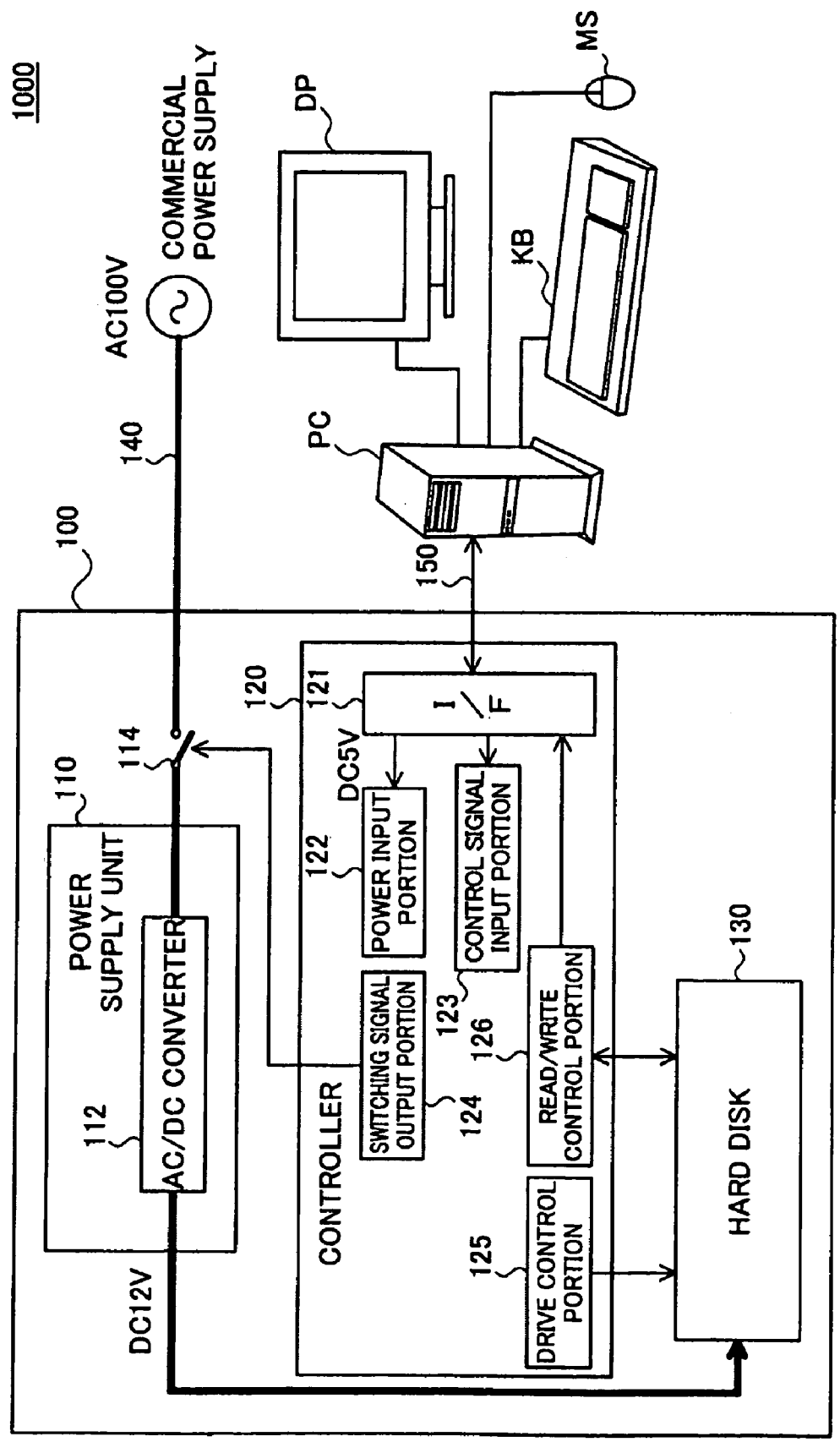
FIG. 1 depicts a general configuration of a computer system 1000 according to a first embodiment of the present invention.

A. Embodiment 1:

A1: System Configuration:

FIG. 1 depicts a general configuration of a computer system 1000 according to a first embodiment of the present invention. This computer system 1000 includes a personal computer PC and a hard disk drive 100. A keyboard KB, a mouse MS, and a display DP are connected to the personal computer PC. The personal computer PC and the hard disk drive 100 are connected by a USB cable 150.

The hard disk drive 100 is furnished inside its housing with a power supply unit 110, an input changeover switch 114, a controller 120, and a hard disk 130.

The power supply unit 110 is connected via the input changeover switch 114 to a commercial power supply (e.g. 100V AC) by a power cable 140. This power supply unit 110 is equipped with an AC/DC converter 112. In the initial state, the input changeover switch 114 will be set to Off as depicted in FIG. 1; and when a commercial power input signal (discussed later) is input, the input changeover switch 114 will switch On. The AC/DC converter 112 is adapted to convert 100V AC to 12V DC for example, and supplies the power to the hard disk 130. Voltage on the secondary side of the AC/DC converter 112 may be set freely according to the specifications of the hard disk 130, for example.

The controller 120 includes an interface (I/F) 121, a power input portion 122, a control signal input portion 123, a switching signal output portion 124, a drive control portion 125, and a read/write control portion 126. In the present embodiment, these portions are implemented through hardware, but some of them could instead be implemented through software.

The interface 121 performs exchange of signals with the personal computer PC. The power input portion 122 is supplied the power (5V DC) by USB bus from the personal computer PC via the USB cable 150 and the interface 121. The control signal input portion 123 receives a control signal used for driving the hard disk 130, from the personal computer PC via the USB cable 150 and the interface 121. In the present embodiment, because the personal computer PC and the hard disk 130 are connected by the USB cable 150, a control signal whose header includes an SOF packet will be input to the control signal input portion 123. When the power is supplied by USB bus to the power input portion 122 and a control signal is input to the control signal input portion 123, the switching signal output portion 124 will output to the input changeover switch 114 a commercial power input signal instructing the input changeover switch 114 to turn On. The drive control portion 125 will control driving of the hard disk 130 in accordance with the control signal input to the control signal input portion 123. Also, the read/write control portion 126 will control reading of data from the hard disk 130 or writing of data to the hard disk 130 in accordance with the control signal input to the control signal input portion 123.

Figure 2:
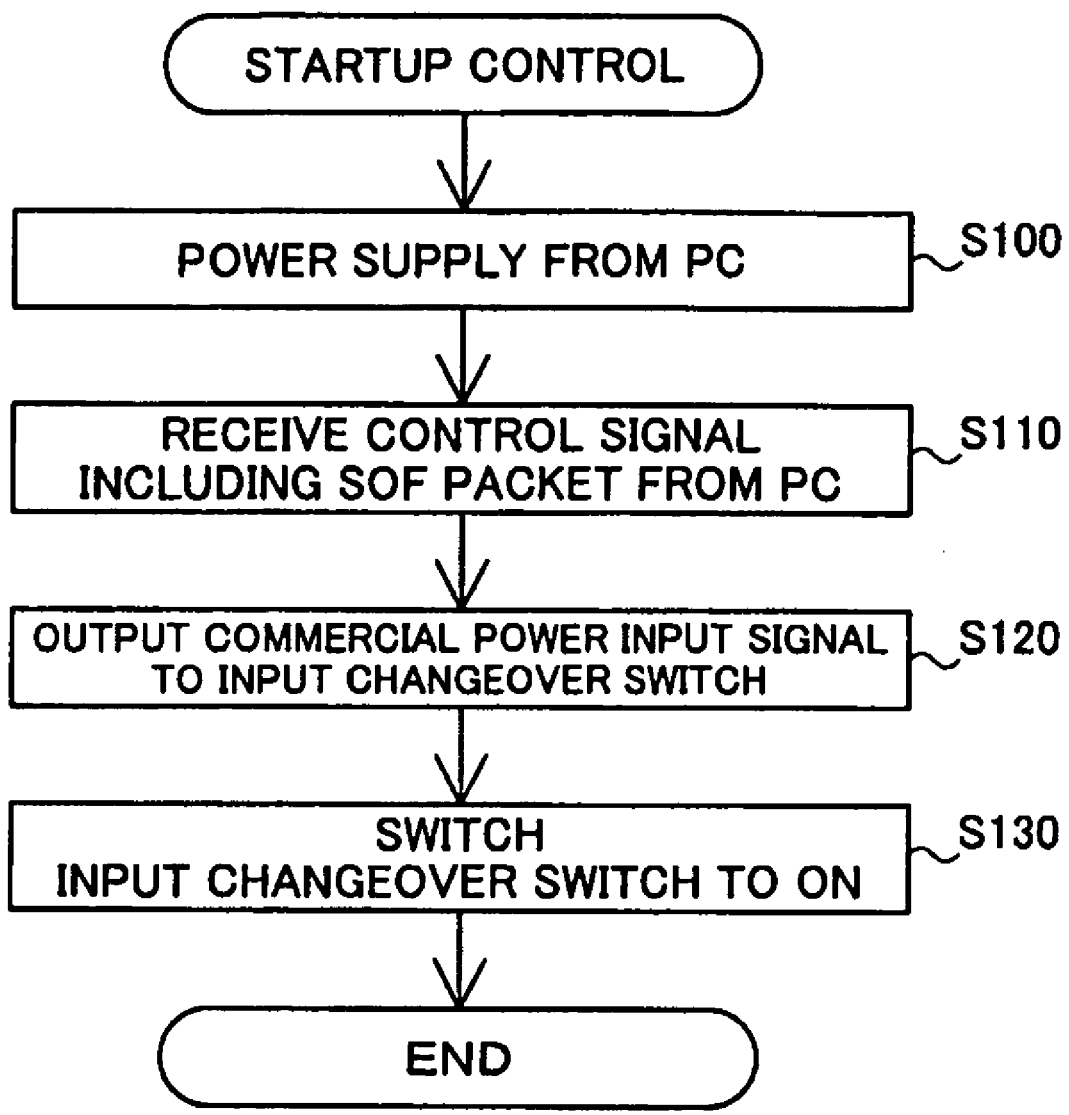
FIG. 2 is a flowchart depicting the flow of startup control in the hard disk drive 100.

A2. Startup Control:

FIG. 2 is a flowchart depicting the flow of startup control in the hard disk drive 100. When the personal computer PC is booted up and the power is supplied by USB bus to the power input portion 122 from the personal computer PC (Step S100), the controller 120 will start up. Subsequently, when a control signal that includes an SOF packet is input from the personal computer PC to the control signal input portion 123 (Step S110), the controller 120, using the switching signal output portion 124, will output a commercial power input signal to the input changeover switch 114 (Step S120). The input changeover switch 114 will then switch On in response to the commercial power input signal (Step S130). In this way, the hard disk 130 will start up in association with boot up of the personal computer PC.

Figure 3:
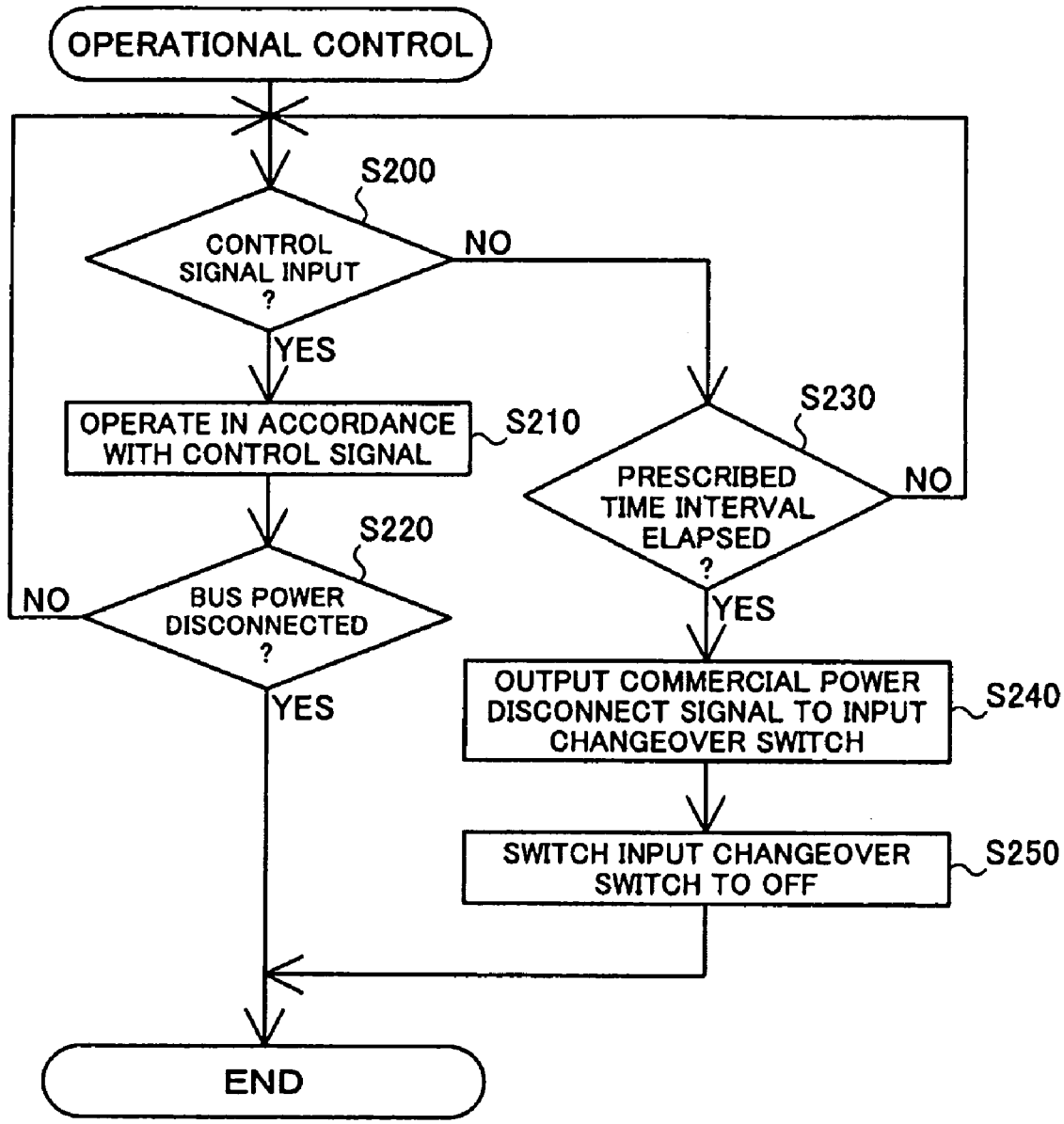
FIG. 3 is a flowchart depicting the flow of operational control of the hard disk drive 100 after startup of the hard disk drive 100.

A3. Operational Control:

FIG. 3 is a flowchart depicting the flow of operational control of the hard disk drive 100 after startup of the hard disk drive 100.

The controller 120 decides whether or not a control signal that includes an SOF has been input to the control signal input portion 123 (Step S200). If the control signal has been input to the control signal input portion 123 (Step S200: YES), the controller 120, using the drive control portion 125 and the read/write control portion 126, will control operation of the hard disk 130 in accordance with the input control signal (Step S210).

The controller 120 will next decide whether the supply of the power by USB bus to the power input portion 122 has been disconnected (Step S220). If the supply of the power by USB bus to the power input portion 122 has not been disconnected (Step S220: NO), the routine will return to Step S200. If on the other hand the supply of the power by USB bus to the power input portion 122 has been disconnected (Step S220: YES), operation of the controller 120 will terminate. At this point, the input changeover switch 114 will automatically go to Off.

In Step S200, in the absence of input of the control signal to the control signal input portion 123 (Step S200: NO), the controller 120 will decide whether a prescribed time interval has passed since the last control signal was input (Step S230). This prescribed time interval may be set arbitrarily (e.g. to 30 seconds). If the prescribed time interval has not elapsed (Step S230: NO), the routine will return to Step S200. If on the other hand the prescribed time interval has elapsed (Step S230: YES), the controller 120, using the switching signal output portion 124, will output a commercial power supply disconnect signal to the input changeover switch 114 (Step S240). In response to the input commercial power supply disconnect signal, the input changeover switch 114 will go Off (Step S250), and supply of power to the hard disk 130 will cease. Thus, reduced power consumption by the hard disk 130 can be achieved.

In this instance, the power supply to the controller 120 is not cut, but the controller 120 is running on the power by USB bus supplied by the personal computer PC. In such an aspect, the hard disk drive 100 may be reduced to the following practice. The hard disk drive 100 could be provided with a control button for example. When the user has operated the control button, a commercial power input signal will again be output to the input changeover switch 114 by the switching signal output portion 124 in the controller 120 so that the input changeover switch 114 goes On.

With a conventional hard disk drive whose power supply turns on and off in association with the power supply of the personal computer PC being turned on and off, the power supply unit is always in the standby state and consumes standby power, even when the power supply of the personal computer PC is off. With the hard disk drive 100 according to Embodiment 1 described above however, the input changeover switch 114 is provided for the purpose of switching the power supply unit 110 between inputting or not inputting commercial power supplied by the commercial power supply. This input changeover switch 114 will assume the Off state (i.e. the supply of the commercial power input to the power supply unit 110 is disconnected) during standby intervals until (i) the power by USB bus is supplied to the power input portion 122 from the personal computer PC and (ii) a control signal is input to the control signal input portion 123, and subsequently (iii) a commercial power input signal is output from the switching signal output portion 124 to the input changeover switch 114. During intervals that the input changeover switch 114 is Off, commercial power will not be supplied to the power supply unit 110 and will not be consumed by the power supply unit 110. Accordingly, using the hard disk drive 100 of Embodiment 1, consumption of standby power by the power supply unit 110 housed in the hard disk drive 100 can be reduced.

Figure 4:
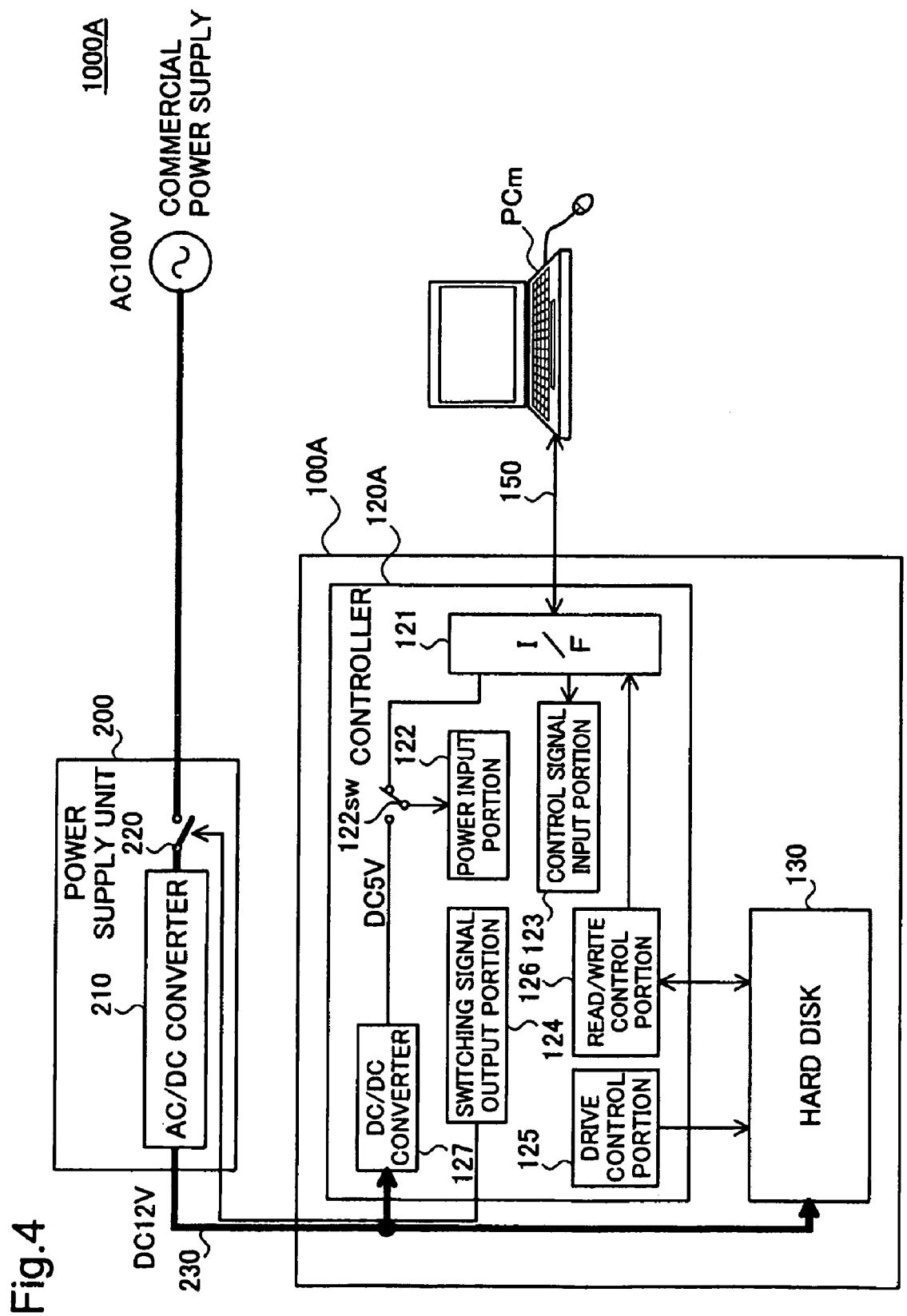
FIG. 4 depicts a general configuration of a computer system 1000A according to a second embodiment of the present invention.

B. Embodiment 2:

B1: System Configuration:

FIG. 4 depicts a general configuration of a computer system 1000A according to a second embodiment of the present invention. This computer system 1000A includes a battery-powered mobile personal computer PCm, a hard disk drive 10A, and a power supply unit 200. The mobile personal computer PCm and the hard disk drive 100A are connected by a USB cable 150.

In the computer system 1000A of the present embodiment, the hard disk drive 100A differs from the hard disk drive 100 of Embodiment 1 in that the power supply unit is not provided inside its housing; and the hard disk drive 100A and the power supply unit 200 for supplying the power to the hard disk drive 100A are connected by a cable 230. The hard disk drive 100A is provided the controller 120A and the hard disk 130 inside its housing.

The power supply unit 200 is connected to a commercial power supply (e.g. 100V AC). This power supply unit 200 is equipped with an AC/DC converter 210, and an input changeover switch 220 connected to the primary side of the AC/DC converter 210. In the initial state, the input changeover switch 220 will be set to Off as depicted in FIG. 4, and will switch On when a commercial power input signal, discussed later, is input to the power supply unit 200. The AC/DC converter 210 is adapted to convert 100V AC to 12V DC for example, and supplies the power to the hard disk 130A via the cable 230.

Like the controller 120 in Embodiment 1, the controller 120A includes an interface (I/F) 121, a power input portion 122, a control signal input portion 123, a switching signal output portion 124, a drive control portion 125, and a read/write control portion 126. The controller 120A further includes a DC/DC converter 127, and a power supply changeover switch 122sw.

The functions of the interface (I/F) 121, the power input portion 122, the control signal input portion 123, the switching signal output portion 124, the drive control portion 125, and the read/write control portion 126 are the same as in Embodiment 1 and will not be discussed in detail here. The DC/DC converter 127 converts the 12V DC supplied by the power supply unit 200 to 5V DC which is equal to the power by USB bus. The power supply changeover switch 122sw switches to supply to the power input portion 122 of the power by USB bus supplied by the mobile personal computer PCm, or of power supplied by the power supply unit 200, i.e. power that has been converted by the DC/DC converter 127. In the initial state, this power supply changeover switch 122sw will be set to supply the power by USB bus power supplied by the mobile personal computer PCm to the power input portion 122, as depicted in FIG. 4.

Figure 5:
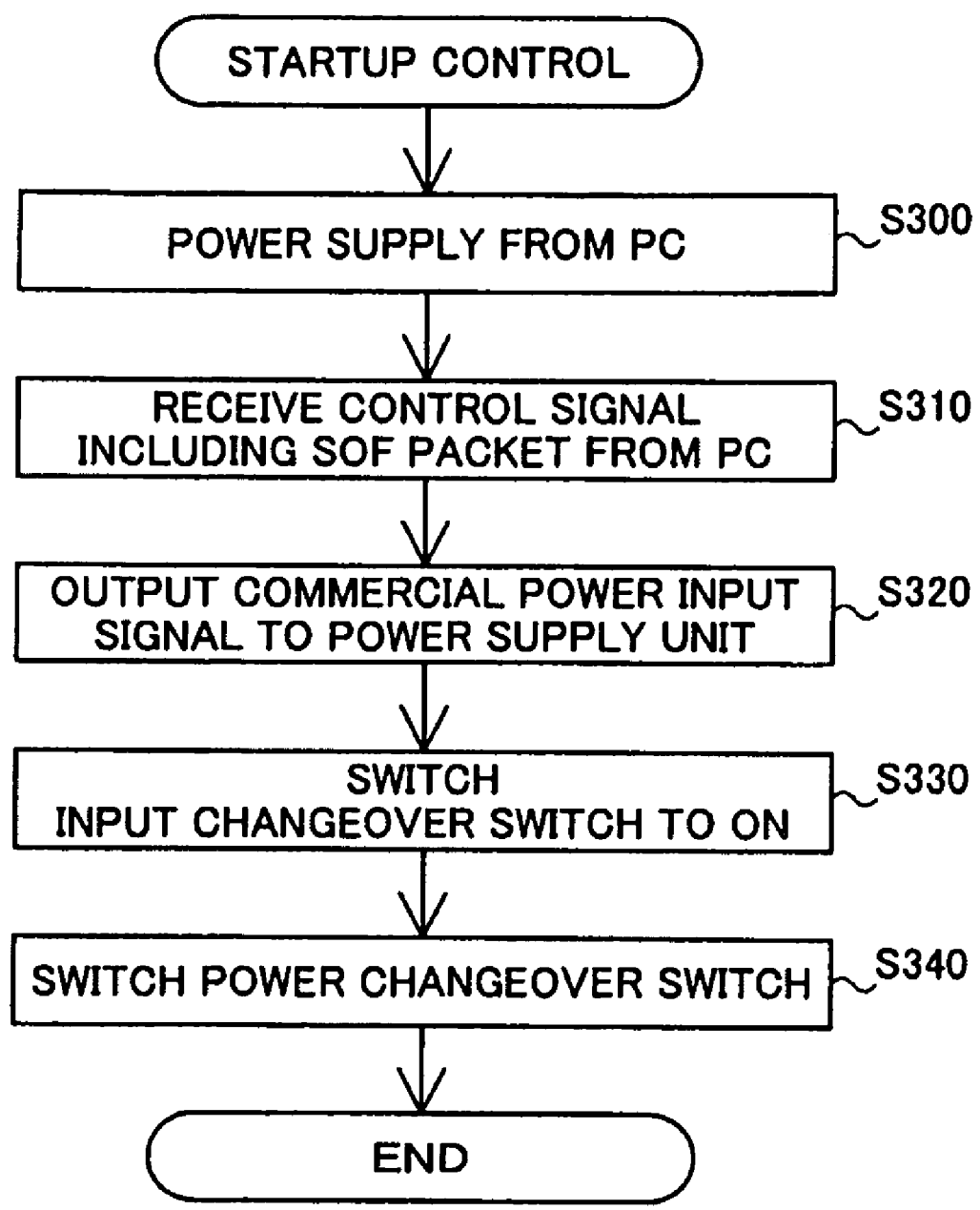
FIG. 5 is a flowchart depicting the flow of startup control of the hard disk drive 100A and of the power supply unit 200.

B2. Startup Control:

FIG. 5 is a flowchart depicting the flow of startup control of the hard disk drive 100A and of the power supply unit 200. When the mobile personal computer PCm is booted up and the power by USB bus is supplied to the power input portion 122 from the mobile personal computer PCm (Step S300), the controller 120A of the hard disk drive 100A will start up. Subsequently, when a control signal that includes an SOF packet is input from the mobile personal computer PCm to the control signal input portion 123 (Step S310), the controller 120A, using the switching signal output portion 124, will output a commercial power input signal to the power supply unit 200 (Step S320). The power supply unit 200 will then switch On when the commercial power input signal is input from the controller 120A (Step S330). The controller 120A will then switch the power supply changeover switch 122sw (Step S340) so that the power supplied by the power supply unit 200 is supplied to the power input portion 122. In this way, the hard disk drive 100A and the power supply unit 200 will start up in association with boot up of the mobile personal computer PCm.

Figure 6:
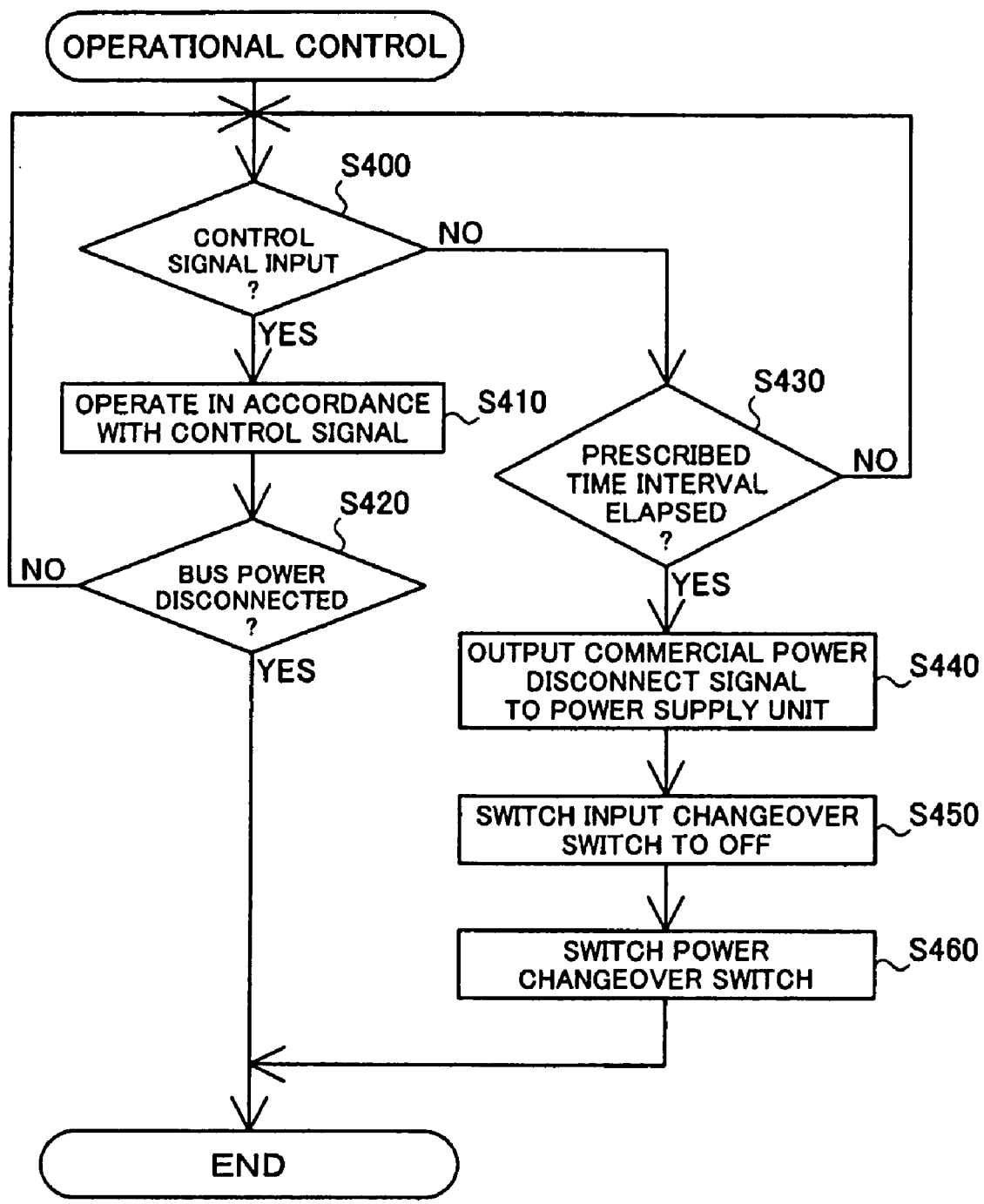
FIG. 6 is a flowchart depicting the flow of operational control of the hard disk drive 100A and the power supply unit 200 after startup of the hard disk drive 100 and the power supply unit 200.

B3. Operational Control:

FIG. 6 is a flowchart depicting the flow of operational control of the hard disk drive 100A and the power supply unit 200 after startup of the hard disk drive 100 and the power supply unit 200. The flow of operational control is substantially identical to the flow of operational control of the hard disk drive 100 after startup of the hard disk drive 100 in Embodiment 1, except that the operation in the steps 440 to 460 are different from that of steps S240 and S250. The operations of steps 400 to 430 in the flow chart in FIG. 6 correspond to that of the steps 200 to 230 in the flow chart in FIG. 3 respectively.

The controller 120A decides whether or not a control signal that includes an SOF has been input to the control signal input portion 123 (Step S400). If the control signal has been input to the control signal input portion 123 (Step S400: YES), the controller 120A, using the drive control portion 125 and the read/write control portion 126, will control operation of the hard disk 130 in accordance with the input control signal (Step S410).

The controller 120A will next decide whether the supply of the power by USB bus power to the power input portion 122 has been disconnected (Step S420). If the supply of the power by USB bus power to the power input portion 122 has not been disconnected (Step S420: NO), the routine will return to Step S400. If on the other hand the supply of the power by USB bus power to the power input portion 122 has been disconnected (Step S420: YES), operation of the controller 120A will terminate. At this point, the power supply changeover switch 122sw will automatically switch to the initial state, and the input changeover switch 220 of the power supply unit 200 will automatically go to Off.

In Step S400, in the absence of input of the control signal to the control signal input portion 123 (Step S400: NO), the controller 120A will decide whether a prescribed time interval has passed since the control signal was last input (Step S430). If the prescribed time interval has not elapsed (Step S430: NO), the routine will return to Step S400. If on the other hand the prescribed time interval has elapsed (Step S430: YES), the controller 120A, using the switching signal output portion 124, will output a commercial power supply disconnect signal to the power supply unit 200 (Step S440). In response to the input commercial power supply disconnect signal, the power supply unit 200 will switch the input changeover switch 220 to Off (Step S450), and supply of power to the hard disk 130 will cease. The controller 120A will then switch the power supply changeover switch 122$sw$ to the initial state, i.e. on in which the power by USB bus power supplied from the mobile personal computer PCm is supplied to the power input portion 122.

In this case, as in Embodiment 1, the power supply to the controller 120A is not cut, but the controller 120A is running on the power by USB bus power supplied by the mobile personal computer PCm. In such an aspect, the hard disk drive 100A may be reduced to the following practice. The hard disk drive 100A could be provided with a control button for example. When the user has operated the control button, a commercial power input signal will again be output to the power supply unit 200 by the switching signal output portion 124 in the controller 120A so that the input changeover switch 220 switches On.

In the hard disk drive 100A and the power supply unit 200 according to Embodiment 2 described above, the power supply unit 200 which is externally connected to the hard disk drive 100A is provided with the input changeover switch 220 for the purpose of switching it between inputting or not inputting commercial power supplied by the commercial power supply to the AC/DC converter 210. This input changeover switch 220 will assume the Off state (i.e. the supply of the commercial power input to the AC/DC converter 210 is disconnected) during standby intervals until (i) the power by USB bus power is supplied to the power input portion 122 from the mobile personal computer PCm and (ii) a control signal is input to the control signal input portion 123, and subsequently (iii) a commercial power input signal is output from the switching signal output portion 124. Consequently, consumption of standby power by the power supply unit 200 which is externally connected to the hard disk drive 100A can be reduced.

The hard disk drive 100A of Embodiment 2 above is furnished with the power supply changeover switch 122$sw$ which is adapted to switch the power input portion 122 between supplying the power by USB bus power supplied by the mobile personal computer PCm and supplying power supplied by the power supply unit 200. When input of power supplied by the power supply unit 200 is enabled, the power supply changeover switch 122$sw$ will be switched so that the controller 120A operates on power supplied by the power supply unit 200. Consequently, by the hard disk drive 100A of Embodiment 2, consumption of power from the battery provided to the mobile personal computer PC can be reduced.

Figure 7:
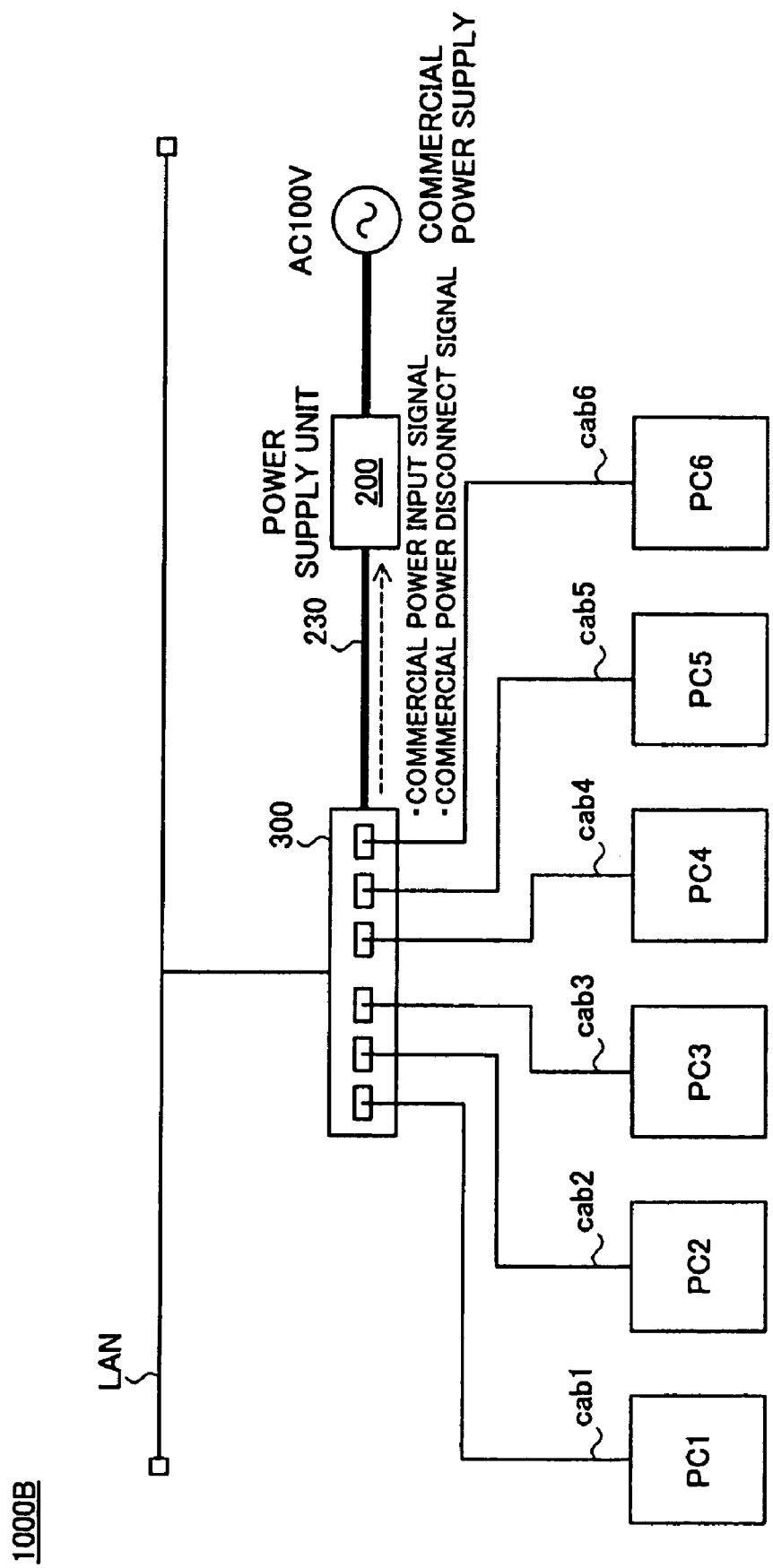
FIG. 7 depicts a general configuration of a computer system 1000B according to a third embodiment of the present invention.

C. Embodiment 3:

FIG. 7 is an illustration depicting a general configuration of a computer system 1000B according to a third embodiment of the present invention. This computer system 1000B is connected to a LAN (Local Area Network), and includes a switching hub 300 that operates on commercial power, a power supply unit 200, and personal computers PC1 to PC6. The switching hub 300 and the power supply unit 200 are connected by a cable 230. The personal computers PC1 to PC6 and the switching hub 300 are respectively connected by LAN cables cab1 to cab6. The power supply unit 200 in the present embodiment is identical to the power supply unit 200 in Embodiment 2.

While an illustration and detailed description are not provided here, the switching hub 300 is furnished with a controller similar to the controller 120A that was furnished to the hard disk drive 100A of Embodiment 2 (See FIG. 4). When any of the personal computers PC1 to PC6 is booted up, the controller provided to the switching hub 300 will start up using power supplied by the booted personal computer PC via the LAN cable; and when a control signal is input, will output a commercial power input signal to the power supply unit 200. When the commercial power input signal is input from the controller of the switching hub 300, the power supply unit 200 will switch the input switching switch 220 to On. When the commercial power disconnect signal is input from the controller of the switching hub 300, the power supply unit 200 will switch the input switching switch 220 to Off.

Like the computer system 1000A of Embodiment 2, the computer system 1000B of Embodiment 3 above can reduce consumption of standby power in the power supply unit 200 which is connected to the switching hub 300.

D. Modified Embodiments:

While the present invention has been shown above through certain preferred embodiments, the invention is in no way limited to these embodiments and may be reduced to practice in various other modes without departing from the spirit of the invention. For example, modifications such as the following would be possible.

D1. Modified Embodiment 1:

While the preceding embodiments described implementation of the present invention in a hard disk drive 100, 100A or switching hub 300, the invention is not limited to these aspects. The present invention may be implemented in any of various kinds of electronic devices that run on power supplied from an electronic device such as a personal computer PC, that is input control signals, and that operate on commercial power. Examples of such electronic devices include external MO drives, CD drives, DVD drives, flash memory drives, and other such external memory devices, as well as audio equipment, printers, modems, self-powered USB hubs, and the like.

D2. Modified Embodiment 2:

In the preceding embodiments, power and control signals are assumed to be presented to the hard disk drive 100, the hard disk drive 100A, or the switching hub 300 by the personal computers PC or PC1 to PC6 or by the mobile personal computer PCm; however, the present invention is not limited to these aspects. Other electronic devices capable of supplying power and control signals could be employed in place of the personal computers PC or PC1 to PC6 or the mobile personal computer PCm.

D3. Modified Embodiment 3:

In Embodiment 1 and Embodiment 2 described previously, the personal computer PC and the mobile personal computer PCm are assumed to be connected to the hard disk drive 100, 100A by a USB cable 150. In Embodiment 3, the personal computers PC1 to PC6 are assumed to be respectively connected to the switching hub 300 by LAN cables cab1 to cab6. However, the present invention is not limited to these aspects. For example, in Embodiment 1 and Embodiment 2, IEEE 1394 cable or eSATA cable could be employed in place of the USB cable 150. Power and control signals can be input from the personal computer PC to the hard disk drive 100 or hard disk drive 100A with such an arrangement as well.

In general, the electronic device of the present invention can be any device capable of receiving power and control signal from another electronic device or devices. Accordingly, it is not essential for connections between the electronic device of the present invention and other electronic devices to be made using single cables such as USB cable, IEEE 1394 cable, eSATA cable, or LAN cable, but could instead employ a separate cable for supplying power, and a separate cable for inputting control signals.

D4. Modified Embodiment 4:

In Embodiment 2 above, the power supply unit 200 is assumed to be provided internally with both an AC/DC converter 210 and an input changeover switch, but in the present invention is not limited to these aspects.

Figure 8:
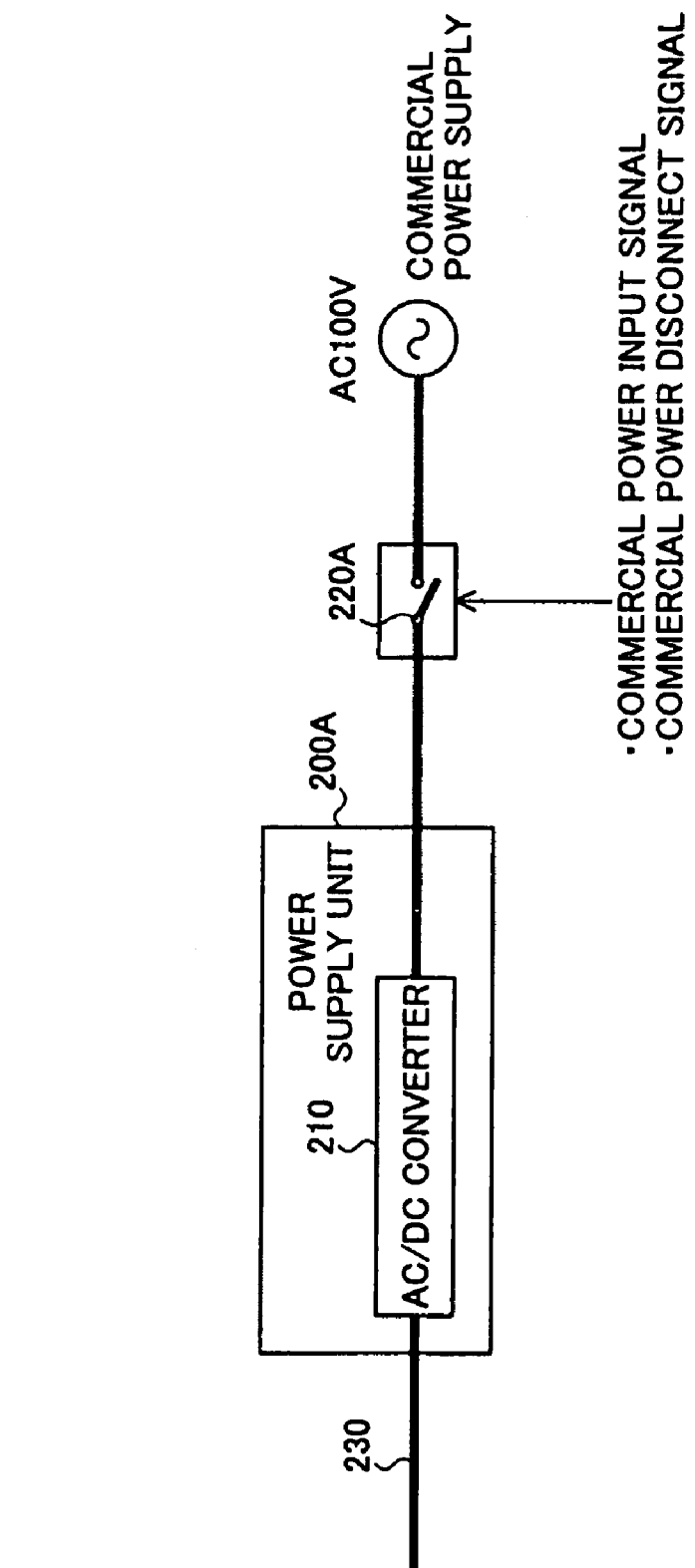
FIG. 8 depicts a general configuration of a power supply unit 200A according to a modified embodiment.

FIG. 8 is an illustration depicting a general configuration of a power supply unit 200A according to a modified embodiment. As illustrated, this power supply unit 200A is furnished with an input changeover switch 220A situated externally on the primary side of the power supply unit 200A chassis. Like the input changeover switch 220 of Embodiment 2, this input changeover switch 220A is Off in the initial state, and is controlled between the On and Off states by a commercial power input signal and a commercial power disconnect signal output by the switching signal output portion 124 of the hard disk drive 100A. Like the power supply unit 200, this power supply unit 200 can reduce consumption of standby power by the power supply unit 200A.

D5. Modified Embodiment 5:

The Program product may be realized as many aspects. For example:

(i) Computer readable medium, for example the flexible disks, the optical disk, or the semiconductor memories;
(ii) Computer including the computer readable medium, for example the magnetic disks or the semiconductor memories; and
(iii) Computer temporally storing the computer program in the memory through the data transferring means.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. An electronic device comprising:
    an operation unit that is supplied with operating power and operates;
    a power supply unit that is supplied with commercial power from a commercial power supply and supplies the operating power to the operation unit;
    an input changeover switch that switches between supplying or not supplying the commercial power from the commercial power supply to the power supply unit; and
    a controller that controls the input changeover switch, wherein
    the controller includes:
        a power input portion that is supplied device power from a master electronic device;
        a control signal input portion that receives a control signal from the master electronic device; and
        a switching signal output portion that, when the device power is being supplied to the power input portion and the control signal is received by the control signal input portion, outputs to the input changeover switch a commercial power input signal instructing the input changeover switch to switch and supply the commercial power to the power supply unit.

2. The electronic device in accordance with claim 1 wherein
    the power input portion includes a power supply changeover switch that switches between supplying the device power to the operation unit as the operating power or supplying the operating power from the power supply unit to the operation unit; and
    the controller switches the power supply changeover switch to supply the operating power from the power supply unit to the operation unit, when the commercial power input signal is output to the input changeover switch by the switching signal output portion.

3. The electronic device in accordance with claim 2 wherein
    the controller switches the power supply changeover switch to supply the device power to the operation unit as the operating power, when the control signal input portion does not receive the control signal for a prescribed time interval after the commercial power input signal has been output to the input changeover switch by the switching signal output portion.

4. The electronic device in accordance with claim 1 wherein
    the controller outputs to the input changeover switch a commercial power disconnect signal instructing the input changeover switch to switch and disconnect the commercial power to the power supply unit, when the control signal input portion does not receive the control signal for a prescribed time interval after the commercial power input signal has been output to the input changeover switch by the switching signal output portion.

5. The electronic device in accordance with claim 4 wherein
    the power input portion includes a power supply changeover switch that switches between supplying the device power to the operation unit as the operating power or supplying the operating power from the power supply unit to the operation unit; and
    the controller switches the power supply changeover switch to supply the operating power from the power supply unit to the operation unit, when the commercial power input signal is output to the input changeover switch by the switching signal output portion.

6. The electronic device in accordance with claim 5 wherein
    the controller switches the power supply changeover switch to supply the device power to the operation unit as the operating power, when the control signal input portion does not receive the control signal for a prescribed time interval after the commercial power input signal has been output to the input changeover switch by the switching signal output portion.

7. The electronic device in accordance with any of claim 1 wherein
    the operation unit is a hard disk drive unit, and
    the master electronic device is a personal computer.

8. The electronic device in accordance with any of claim 1 wherein the controller and the master electronic device are connected by a USB (Universal Serial Bus) cable, the device power is supplied by USB bus power from the master electronic device via the USB cable, and the control signal includes an SOF (Start of Frame) packet in a header.

9. An electronic device comprising:

an operation unit that is supplied with operating power and operates; and a controller, wherein the electronic device is electrically connected with a power supply unit that is supplied with commercial power from a commercial power supply and configured to switch between being supplied or not being supplied with the commercial power from the commercial power supply, wherein the controller includes:
- a power input portion that is supplied with device power from a master electronic device;
- a control signal input portion that receives a control signal from the master electronic device; and
- a switching signal output portion that, when the device power is being supplied to the power input portion and the control signal is received by the control signal input portion, outputs to the power supply unit a commercial power input signal instructing to be supplied with the commercial power.

* * * * *